June 4, 1935.  P. DULAC  2,003,348

MACHINE FOR CUTTING AND RESHARPENING THE REEDS OF WIND INSTRUMENTS

Filed Dec. 26, 1934

Pierre Dulac
INVENTOR

By Otto Munk
his ATTY.

Patented June 4, 1935

2,003,348

UNITED STATES PATENT OFFICE 2,003,348

MACHINE FOR CUTTING AND RESHARPENING THE REEDS OF WIND INSTRUMENTS

Pierre Dulac, Paris, France, assignor to Société Charles Chedeville, Albert Lelandais et Cie, Eure, France, a corporation of France Application December 26, 1934, Serial No. 759,158
In France November 28, 1934

11 Claims. (Cl. 164—73)

The object of the present invention is to provide a simple machine for cutting and resharpening the reeds that are used in some wind instruments, such as clarinets, saxophones, and the like.

By this machine, it is possible to resharpen, at home, a reed the edge of which has been injured.

According to the essential feature of the present invention, the reed cutting machine, which is of very small dimensions and is designed to be operated manually and can even be portable, includes a frame, adapted to be fixed to a table or any other support, and in which is slidably mounted a guiding rod. On this frame is fixed a block of cast iron or steel, the upper face of which includes a table carrying the reed to be cut, and a pattern of the finished surface to be obtained, these parts being preferably disposed in line with each other. Furthermore, a planing tool is provided with a roller cooperating with said pattern and is pivotally connected with said guiding rod. The cutting blade of said planing tool is accurately shaped and fixed to the body of said planing tool.

These and other features of the present invention will more clearly appear from the following detailed description of a specific embodiment thereof.

A preferred embodiment of the present invention will be hereinafter described, with reference to the accompanying drawing, given merely by way of example, and in which.

Figure 1:
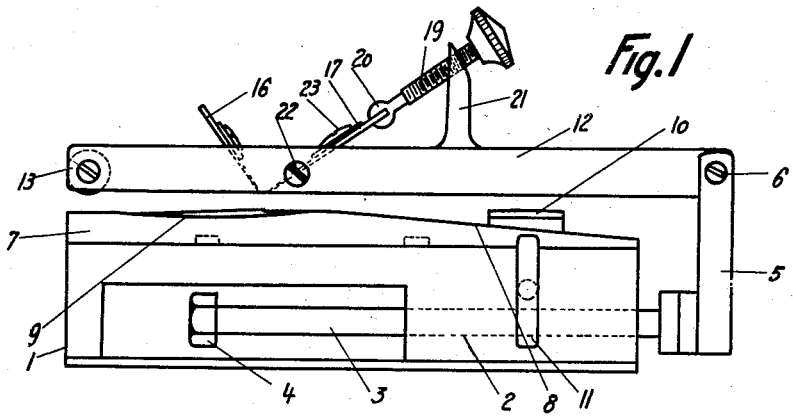
Fig. 1 is a side elevational view of the machine according to the present invention.

The machine illustrated by the accompanying drawing, includes a frame or base 1 designed to be fixed, by any suitable means, to a table or any other support. This frame 1 is provided with a cylindrical hole or channel 2 in which a guiding rod 3 can slide with a snug fit parallel to the axis of said hole and can rotate about said axis. This rod 3 is provided with a stop 4 at one end and its other end carries a support 5 provided with a hinge 6 for the body of the planing tool.

Figures 5, 6:
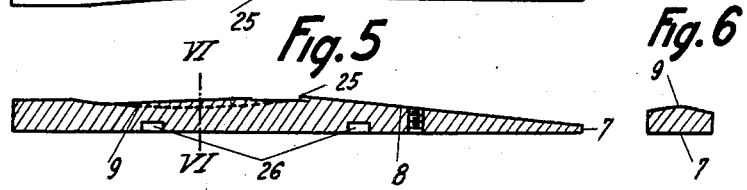

A table 7 is fixed on said frame 1 by screws or any other means, said table being provided with holes 26 (Fig. 5) designed to cooperate with studs for the accurate positioning of said table with respect to said frame. The upper face of table 7 includes two parts. One of said parts is plane and serves to support the reed. This surface 8 is oblique with respect to the axis of rod 3, the upper face of the reed supported by this part 8 is approximately parallel to said axis, and the line passing through the cutting edge of the planing tool 17 and tangent to the guiding roller 13 is substantially parallel to said rod 3. The other part 9 of the upper face of table 7 constitutes the pattern shaped like the desired finished reed, and it serves as a roller track for the roller 13 carried by the body 12 of the planing tool.

As above explained, this table 7 can be readily removed and immediately replaced by another one corresponding to the type and shape of reed that is to be cut or resharpened.

Said reed is held on table element 8 by any suitable holding member 10 controlled in any suitable manner, for instance by means of a wing screw 11 mounted on the side of frame 1.

Figure 2:
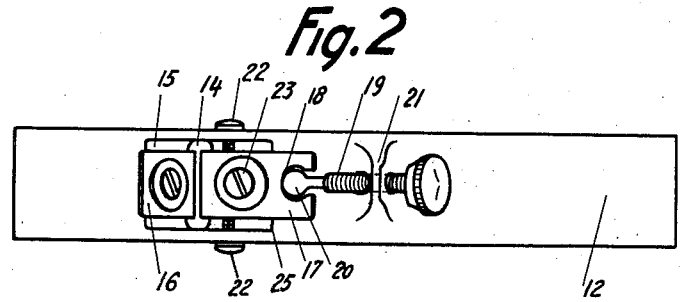
Figs. 2 and 3 are a plan view and a longitudinal sectional view, respectively, of the planing tool of the machine.
Figure 3:
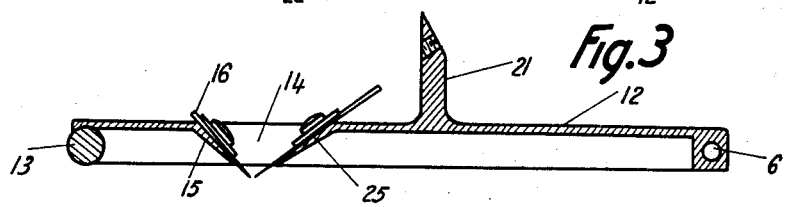
Figure 4:
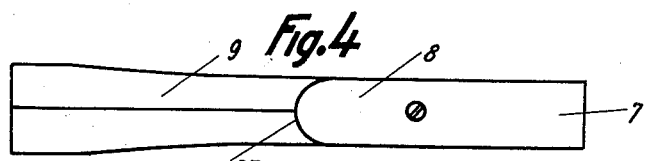
Figs. 4, 5 and 6 is a plan view, a longitudinal sectional view, and a cross sectional view, respectively, of the block carried by the frame for supporting the piece of work.

The planing tool (Figs. 2 and 3) is carried by a body 12 pivoted at 6 to the supporting member 5 carried by guiding rod 3.

At the end opposed to hinge 6, this body 12 is provided with a roller 13 designed to cooperate with surface 9.

It will therefore be readily understood that this body 12 will slide in the longitudinal direction and will oscillate transversely with respect to frame 1, the body 12 being permanently guided by rod 3 movable in frame 1 and by roller 13 movable on surface 9.

The body 12 is provided with a recess 14, of rectangular pyramidal shape, having two oblique faces and two lateral cheeks. On the oblique face 15, which is on the side of roller 13, there is provided a counterblade 16, which is permanently fixed on said face.

Figure 7:
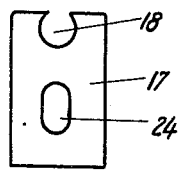
Fig. 7 shows the cutting blade of the planing tool.

On the other hand, on the oblique face 25, which is on the side of the hinge, there is adjustably fixed a cutting blade 17 (Fig. 7) which is provided to plane the upper face of the reed in accordance with the displacements of roller 13 along surface 8.

This blade 17 is provided with a notch 18 which makes it possible to move it in its own plane through the action of a screw 19 having a ball-shaped head 20 and which is mounted in a fixed nut 21. This blade is guided laterally by screws 22 which permits one to determine the position of the edge of the blade at the bottom of the recess 14. After blade 17 has been suitably positioned, it can be fixed by means of a screw 23 extending through aperture 24 of the blade.

It will be readily understood that, owing to the possibility of positioning blade 17 with respect to body 12, and owing to the movement of said body, which is guided by rod 3 and hinge 6, the edge of blade 17 will cut, in the reed fixed on part 8, a surface corresponding exactly to that of part 9. As the position of said reed is adjustable by holding element 10, it is possible to cut or resharpen the end of any kind of reed under the best possible conditions of precision at the desired point, by making use of the corresponding table 7.

Portion 8 of this table forms a rounded projection 25 on which the end of the reed sharpened by blade 17 will be cut.

The length of the whole machine is approximately equal to two reeds (corresponding to parts 8 and 9), and its width is approximately equal to that of a reed. This machine therefore takes up as little room as possible. It can be easily operated by hand and easily adjusted. It can therefore be used at home with great advantage so as to prolong the time of use of reeds which, up to the present time, had to be discarded as soon as their edge was slightly injured either by accident or by wear and tear.

While I have, in the above description, disclosed what I deem to be a practical and efficient embodiment of the present invention, it should be well understood that I do not wish to be limited thereto as there might be changes made in the arrangement, disposition and form of the parts, without departing from the principle of the present invention as comprehended within the scope of the appended claims.

What I claim is:

1. A machine for cutting reeds for wind instruments, which comprises, in combination, a frame adapted to support the reed to be cut, a pattern rigid with said frame, a member movable in said frame so as to be able both to slide with respect thereto along a given line and to pivot about said line, means for cutting said reed, and a support for said cutting means pivotally connected with said member and arranged to cooperate with said pattern.

2. A machine for cutting reeds for wind instruments, which comprises, in combination, a frame, means on said frame for fixing the reed to be cut in position thereon, a pattern rigid with said frame, a member movable in said frame so as to be able both to slide with respect thereto along a given line and to pivot about said line, means for cutting said reed, a support for said cutting means pivotally connected with said member, and a roller journalled on said support and adapted to run along said pattern.

3. A machine according to claim 1 in which the frame is so devised as to support the reed to be cut in a position in which it is in line with said pattern.

4. A machine for cutting reeds for wind instruments which comprises, in combination, a frame, a block adapted to be removably fixed on said frame including a part adapted to support the reed to be cut and a pattern in line with said part, means for fixing the reed to be cut to said part, a member movable in said frame so as to be able both to slide with respect thereto along a given line and to pivot about said line, means for cutting the reed, a support for said cutting means pivotally connected with said member, and a roller journalled on said support and adapted to run along said pattern.

5. A machine according to claim 4 in which said frame includes an upper face adapted to support said block, the under face of said block being provided with holes, and studs on said upper face of said frame adapted to cooperate with said holes for accurately positioning said block on said frame.

6. A machine according to claim 4 in which the part of said block that is adapted to support the reed to be cut is inclined so as to compensate for the thickness of the reed at one end thereof.

7. A machine according to claim 4 further including a rounded ridge on said block between said pattern and said part adapted to support the reed to be cut, for permitting the easy cutting of the edge of the reed.

8. A machine according to claim 2 in which the means for fixing the reed to be cut include a holding member and means on the side of said frame for controlling said member.

9. A machine according to claim 4 in which the means for fixing the reed to be cut include a holding member and means on the side of said frame for controlling said member.

10. A machine according to claim 4 in which said cutting means consist of a blade movably mounted in said support, further including screws for laterally adjusting the position of said blade in said support.

11. A machine according to claim 4 in which said cutting means consist of a blade slidably mounted in said support in the manner of a plane blade, further including a fixation screw for said blade, the latter being provided with an elongated slot for said screw, and with a round notch in its top edge, and a screw movably carried by said support and having a rounded end engaging in said notch for adjusting the position of said blade with respect to said support.

DULAC, PIERRE.